(12) United States Patent
Suzuki

(10) Patent No.: US 7,383,752 B2
(45) Date of Patent: Jun. 10, 2008

(54) OPERATING PEDAL DEVICE FOR AUTOMOBILE

(75) Inventor: Hiroyoshi Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 11/054,364

(22) Filed: Feb. 10, 2005

(65) Prior Publication Data
US 2005/0188781 A1 Sep. 1, 2005

(30) Foreign Application Priority Data
Feb. 20, 2004 (JP) ............... 2004-044699

(51) Int. Cl.
G05G 1/14 (2006.01)
B60K 28/10 (2006.01)
B60T 7/12 (2006.01)
B60T 7/22 (2006.01)

(52) U.S. Cl. ............. 74/512; 74/560; 180/274

(58) Field of Classification Search ........ 74/512, 74/513, 560, 527; 180/274, 281, 282, 90, 180/90.6, 81, 82
See application file for complete search history.

(56) References Cited

U.S. PATENT DOCUMENTS

| | | | | |
|---|---|---|---|---|
| 6,076,422 A | | 6/2000 | Tabata | 74/512 |
| 6,354,171 B1 * | | 3/2002 | Wolpert et al. | 74/512 |
| 6,655,489 B2 * | | 12/2003 | Kawai et al. | 180/274 |
| 6,810,766 B2 * | | 11/2004 | Mizuma | 74/512 |
| 2005/0217264 A1 * | | 10/2005 | Miyoshi et al. | 60/554 |
| 2006/0053952 A1 * | | 3/2006 | Fujioka et al. | 74/527 |
| 2006/0162481 A1 * | | 7/2006 | Sato | 74/512 |

FOREIGN PATENT DOCUMENTS

| | | |
|---|---|---|
| EP | 0 803 420 | 10/1997 |
| EP | 1 247 710 | 10/2002 |
| JP | 3267182 | 1/2002 |

OTHER PUBLICATIONS

English Abstract of Pub. No. EP001247710A1, Pubn Date: Oct. 9, 2002.*
PTO 2522, Translation of EP 1 247 710 A1, Brake Pedal Assembly for a Motor Vehicle, Frank Mencarelli et al. US PTO, Feb. 2007.*
European Search Report dated Apr. 14, 2005.

* cited by examiner

Primary Examiner—Vinh T. Luong
(74) Attorney, Agent, or Firm—Kratz, Quintos & Hanson, LLP.

(57) ABSTRACT

An operating pedal device for an automobile, which is designed to suppress rearward movement of a depression portion of an operating pedal caused by rearward movement of a dashboard upon a frontal collision of the automobile. An operating member is opposed to a control lever forward-rearward swingably supported on a dashboard or a pedal bracket for supporting an operating pedal. The operating member is supported on a steering hanger beam in the rear of the control lever to swing the control lever forward in response to rearward movement of the dashboard upon frontal collision of an automobile. The operating pedal is provided with an engagement portion to be brought into engagement with the control lever upon forward swing of the control lever to force forward swing of the operating pedal.

1 Claim, 6 Drawing Sheets

OPERATING PEDAL DEVICE FOR AUTOMOBILE

RELATED APPLICATION DATA

The Japanese priority application No. 2004-44699 upon which the present application is based is hereby incorporated in its entirety herein by reference.

BACKGROUND OF THE INVENTION

1. Field of the Invention

The present invention generally relates to an operating pedal device for an automobile, in which an operating pedal having a depression portion at its lower end and forward-rearward swingably supported on a pedal bracket connected to a dashboard of a vehicle body is connected to an input rod of an actuating device mounted to a front surface of the dashboard. More particularly, this invention relates to an improvement in an operating pedal device for an automobile which is designed to suppress rearward movement of a depression portion of an operating pedal caused by rearward movement of a dashboard upon frontal collision of the automobile.

2. Description of the Related Art

Japanese Patent No. 3267182 (hereinafter, "Patent Document 1") discloses an operating pedal device for an automobile, which is designed to suppress rearward movement of a depression portion of an operating pedal caused by rearward movement of a dashboard upon frontal collision of the automobile. In this device, a pedal bracket is constructed to be plastically deformed upon reception of a shock load equal to or larger than a predetermined value, and an operating member having a high rigidity and fixedly mounted on a support member constituting a portion of a vehicle body is opposed to the pedal bracket in the rear of the pedal bracket so that the pedal bracket is plastically deformed by the shock load applied by the operating member in response to the rearward movement of the pedal bracket; thereby, suppressing the rearward movement of the operating pedal.

In the operating pedal device described in Patent Document 1, the pedal bracket is plastically deformed by the shock load applied by the operating member in response to the rearward movement of the pedal bracket the upon the frontal collision of the automobile. Therefore, such an operating pedal device has the following drawbacks: sufficient enhancement in rigidity of the pedal bracket for supporting the operating pedal is limited; increase in weight of the vehicle body is brought about by need for sufficiently increasing the rigidity of the support portion for supporting the operating member. Moreover, it is difficult to stabilize the plastic deformation characteristic of the pedal bracket.

SUMMARY OF THE INVENTION

Accordingly, it is an object of the present invention to provide an operating pedal device for an automobile, wherein while eliminating the above-described drawbacks associated with the conventional device, rearward movement of an operating pedal, particularly of its depression portion, caused by rearward movement of a dashboard can be suppressed upon frontal collision of the automobile.

In order to achieve the above-described object, the present invention provides an operating pedal device for an automobile, in which an operating pedal having a depression portion at its lower end and forward-rearward swingably supported on a pedal bracket connected to a dashboard constituting a portion of a vehicle body is connected to an input rod of an actuating device mounted to a front surface of the dashboard. In the present invention, an operating member is opposed to a control lever forward swingably supported on the dashboard or the pedal bracket, the operating member being supported on a support member constituting a portion of the vehicle body in the rear of the control lever to swing the control lever forward in response to rearward movement of the dashboard upon frontal collision of the automobile. Also, the operating pedal is provided with an engagement portion adapted to be brought into engagement with the control lever upon forward swing of the control lever to force forward swing of the operating pedal.

The actuating device and the operating pedal correspond respectively to a vacuum booster 4 and a brake pedal 8 in an embodiment of the present invention, which will be described below, and the engagement portion corresponds to an engagement pin 16.

According to the present invention, when the dashboard is moved to a large extent toward a vehicle compartment due to frontal collision of the automobile, the control lever is moved rearward together with the dashboard and abuts against the operating member to swing forward, and then the control lever engages with the engagement portion of the operating pedal to swing the operating pedal forward around a first pivot, thereby suppressing the rearward movement of the depression portion of the operating pedal. Therefore, it is not necessary to cause the pedal bracket to plastically deform, and hence the rigidity of the pedal bracket for supporting the operating pedal can be sufficiently enhanced. Further, it is not necessary to specially increase the strength of the support member for supporting the operating member, and hence the weight of the support member can be decreased.

Upon the above-described collision, the operating pedal is depressed as it is without being deformed. Therefore, when the present invention is applied to a brake pedal, a braking force can be automatically reliably generated to avoid the secondary collision due to the movement of the vehicle after the primary collision.

Moreover, the swing of the control lever depends on the relative displacement of the control lever and the operating member following the rearward movement of the dashboard, and hence the swing characteristic of the control lever can be stabilized.

In addition, the depression amount of the operating pedal can be freely set by selection of sizes of the members.

BRIEF DESCRIPTION OF THE DRAWINGS

The mode for carrying out the present invention will now be described by way of a preferred embodiment of the present invention shown in the accompanying drawings.

DETAILED DESCRIPTON OF THE PREFERRED EMBODIMENT

Figure 1:
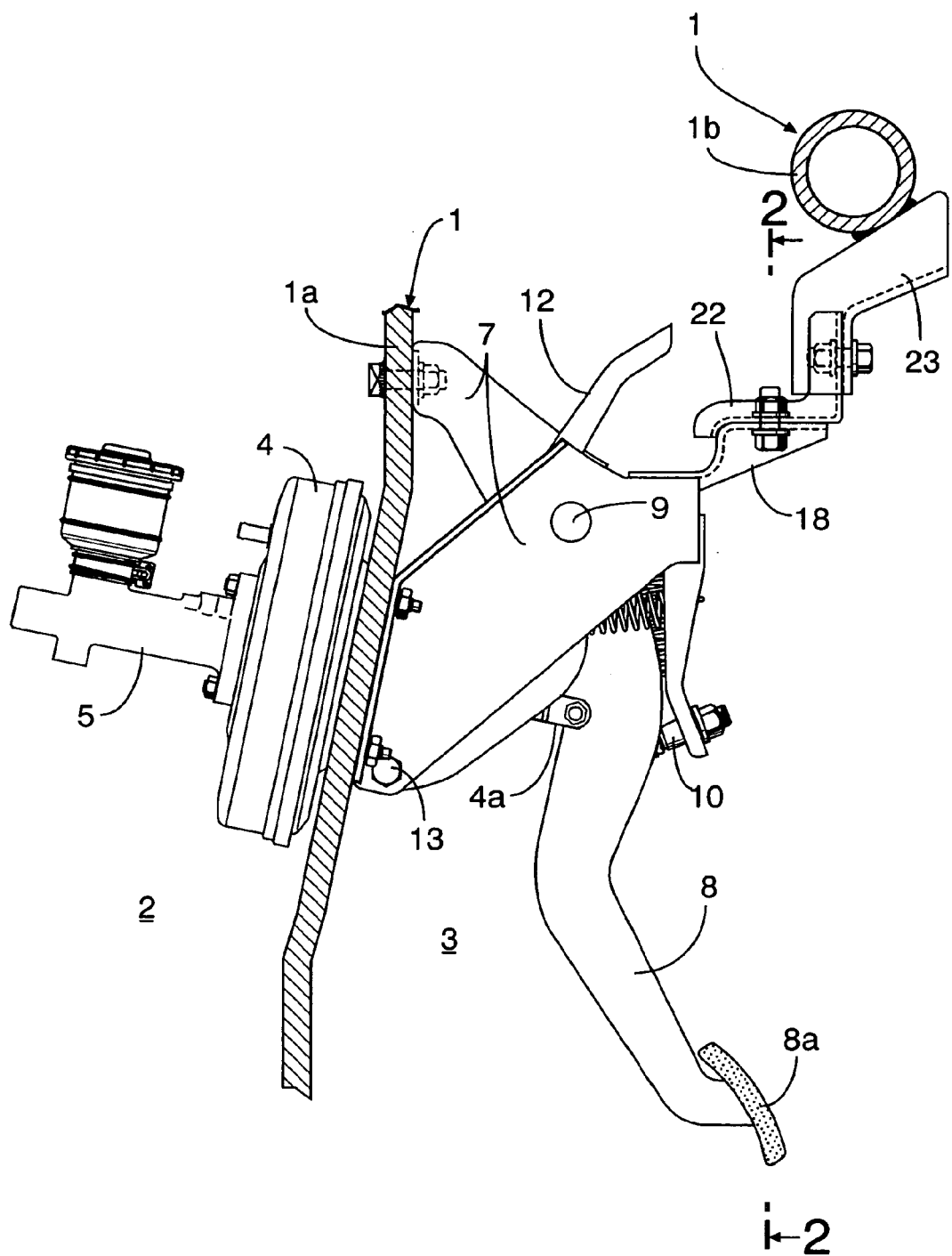
FIG. 1 is a side view of an operating pedal device for an automobile according to an embodiment of the present invention.
Figure 2:
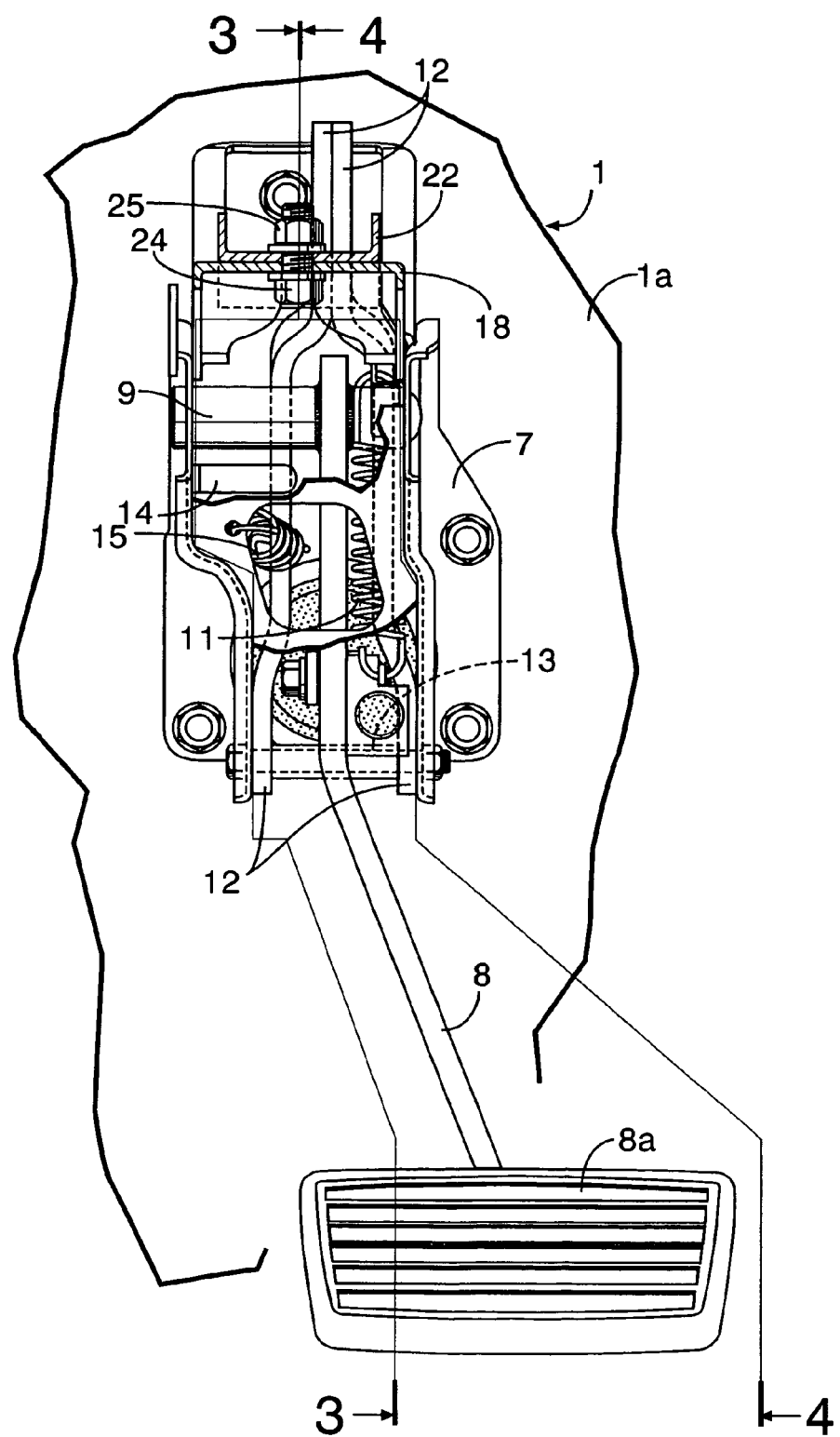
FIG. 2 is a sectional view taken along a line 2-2 in FIG. 1.

First, in FIGS. 1 and 2, reference symbol 1a denotes a dashboard constituting a portion of a vehicle body 1 of an automobile, and is disposed to partition an engine room 2 and a vehicle compartment 3 in the rear of the engine room 2 from each other. A vacuum booster 4 is bolted to a front surface of the dashboard 1a. A brake master cylinder 5 is mounted to a front end of the vacuum booster 4, and operated in a boosting manner by the vacuum booster 4. Upon operation, the brake master cylinder 5 can generate a hydraulic pressure for operating a front wheel brake and a rear wheel brake of the automobile. The vacuum booster 4 includes an input rod 4a oscillatably connected to a control valve provided within the vacuum booster 4 so that the vacuum booster 4 can be operated by operating the input rod 4a to move forward. The input rod 4a is disposed so as to pass through the dashboard 1a with its rear end protruding into the vehicle compartment 3.

Figure 3:
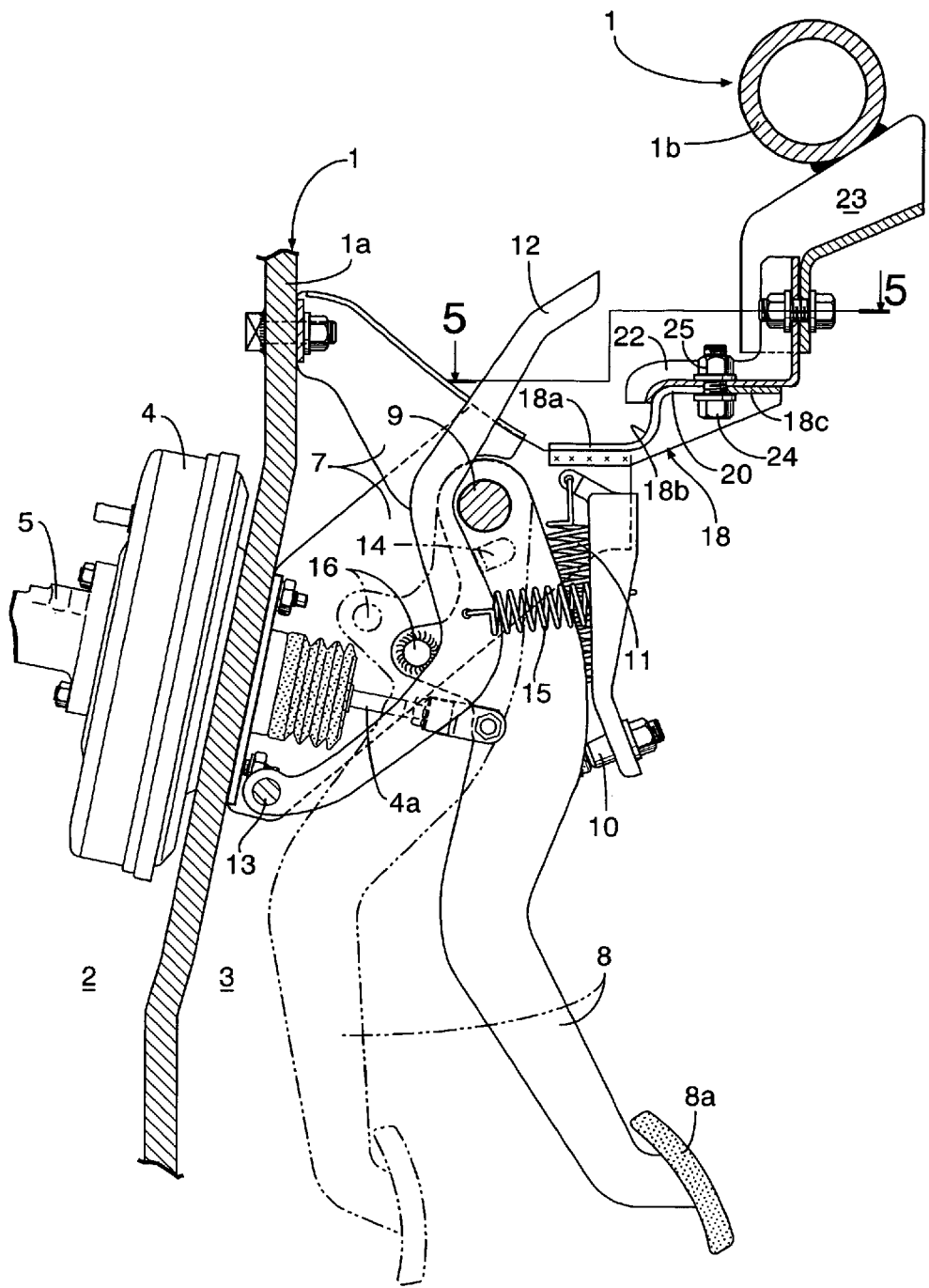
FIG. 3 is an enlarged sectional view taken along a line 3-3 in FIG. 2.
Figure 4:
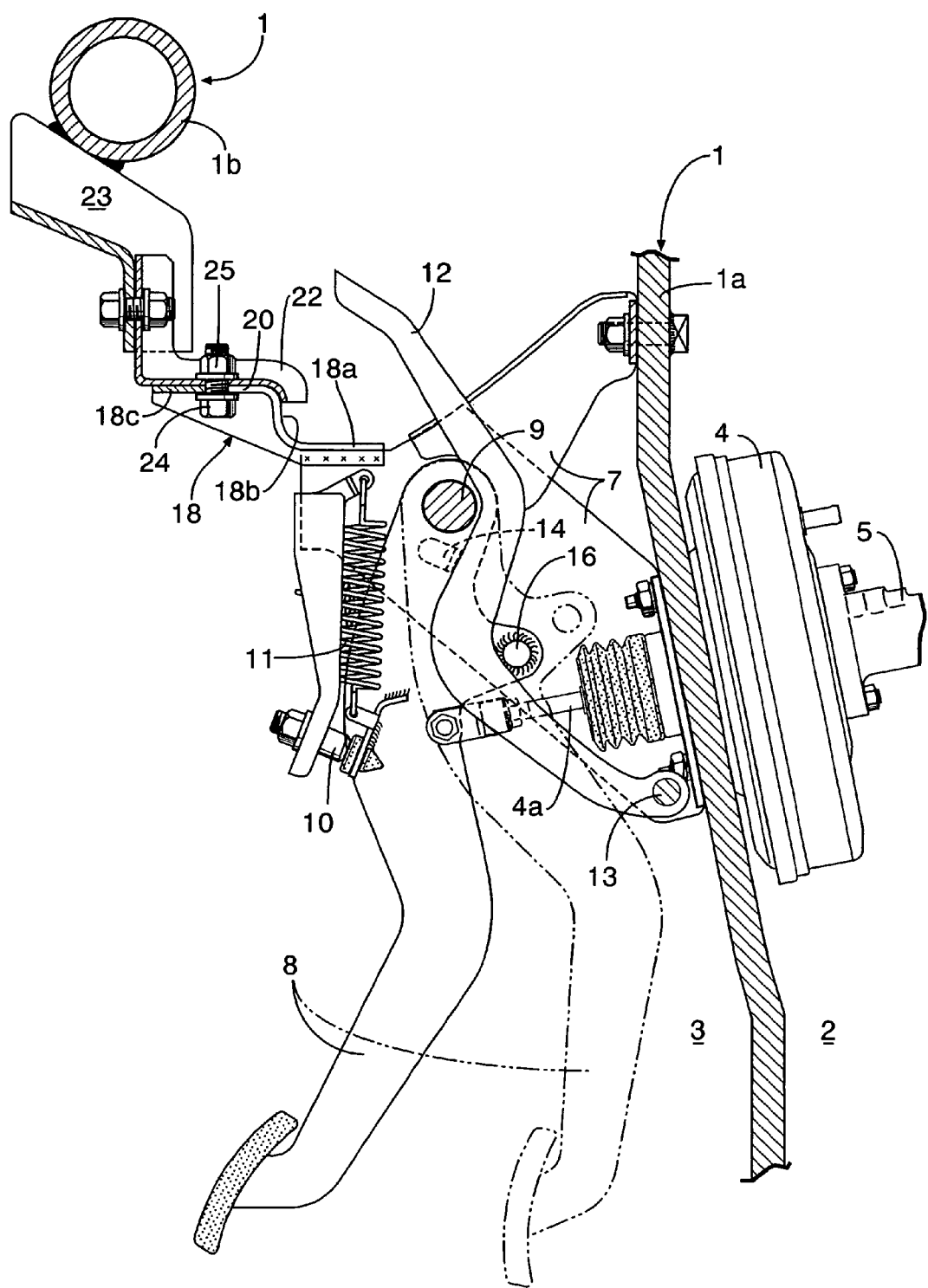
FIG. 4 is an enlarged sectional view taken along a line 4-4 in FIG. 2.

As clearly shown in FIGS. 2 to 4, a brake pedal 8 having a depression portion 8a at its lower end is forward-rearward swingably mounted at its upper end to a pedal bracket 7 fixedly mounted on a rear surface of the dashboard 1a through a first pivot 9 extending in a lateral direction of the automobile. A stopper means (not shown) for defining a retraction limit of the brake pedal 8 through the input rod 4a is built in the vacuum booster 4. A first return spring 11 for urging the brake pedal 8 toward the retraction limit is mounted under tension between the pedal bracket 7 and the brake pedal 8. In the drawings, reference numeral 10 denotes a brake switch adapted to be brought into a turned-off state to put out a brake lamp (not shown) upon returning of the brake pedal to the retraction limit.

Further, a control lever 12 is mounted at its lower end to the pedal bracket 7 through a second pivot 13 disposed in parallel to the first pivot 9 in front of the brake pedal 8 and below the first pivot 9. A lever stopper 14 is mounted to the pedal bracket 7 to support a rear face of an upper end of the control lever 12 and define a retraction limit of the control lever 12. A second return spring 15 for urging the control lever 12 toward its retraction limit is mounted under tension between the pedal bracket 7 and the control lever 12.

The control lever 12 extends until its upper end reaches a point above the pedal bracket 7, and is curved so that its intermediate portion is bulged toward the brake pedal 8. An engagement pin 16 is projectingly provided on one side of the brake pedal 8, and usually opposed to a front surface of the intermediate portion of the control lever 12 with a small clearance left therebetween.

Figure 5:
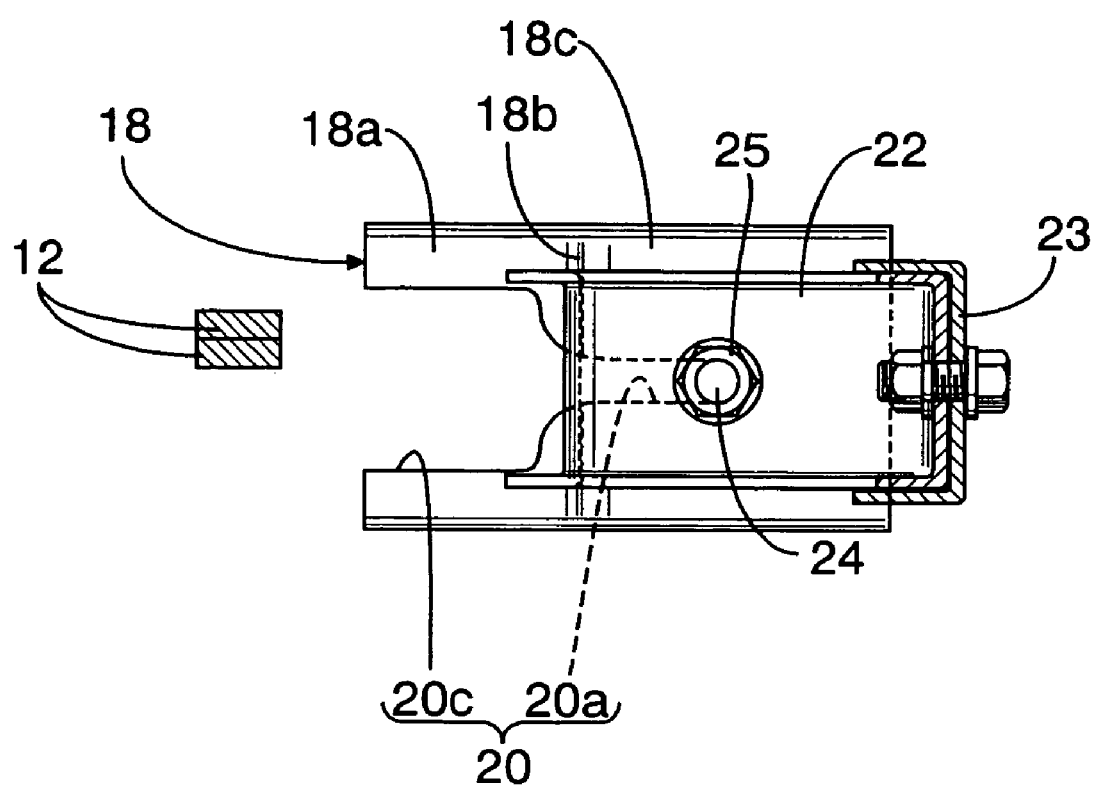
FIG. 5 is a sectional view taken along a line 5-5 in FIG. 3.

Further, a guide member 18 is connected to an upper end of the pedal bracket 7 and overhangs rearward from the brake pedal 8. The guide member 18 includes a lower stage portion 18a connected to the pedal bracket 7, and an upper stage portion 18c connected to the lower stage portion 18a through an upward extending portion 18b to extend rearward, as shown in FIGS. 3 and 5. A guide groove 20 is formed to extend from the lower stage portion 18a to the upper stage portion 18c, and open toward an upper end of the control lever 12. The guide groove 20 is smaller in width at a portion 20a provided at the upper stage portion 18c with its rear end closed, and is larger in width at a portion 20b provided at the upward extending portion 18b and the lower stage portion 18a.

A steering hanger beam 1b is disposed in the vehicle compartment 3 above and in the rear of the pedal bracket 7, and constitutes a portion of the vehicle body 1 to support a steering column (not shown). Thus, the steering hanger beam 1b can be referred to as a support member. An operating member 22 is secured by a bolt 24 to the steering hanger beam 1b through a stay 23.

The operating member 22 is adapted to relatively push an upper end of the control lever 12 during rearward movement of the dashboard 1a caused by the frontal collision of the automobile, and is disposed so that it can be slid forward on an upper surface of the upper stage portion 18c. The operating member 22 is fastened to the upper stage portion 18c with a predetermined fastening force by a bolt 24 passed through the narrower portion 20a of the guide groove 20 and a nut 25 threadedly engaged with the bolt 24. Thus, the operating member 22 and the upper stage portion 18c are slid on each other in a forward-rearward direction upon application of a forward or rearward load equal to or larger than a predetermined value to the guide member 18 and the operating member 22. In this case, the bolt 24 is disposed with its head turned downwards, and the width of the wider portion 20b of the guide groove 20 is larger than the maximum diameter of the head of the bolt 24. Therefore, even when the operating member 22 and the upper stage portion 18c are greatly slid on each other in the forward-rearward direction, the head of the bolt 24 is not interfered with by the wider portion 20b of the guide groove 20.

The operation of the embodiment will be described below.

In reference to FIG. 3, when the brake pedal 8 is depressed forward against a preset load of the first return spring 11 in order to operate the brake master cylinder 5 in a boosting manner, the input rod 4a is operated forward to bring the vacuum booster 4 into an operative state, whereby the brake master cylinder 5 can be operated in the boosting manner. In this process, the control lever 12 is retained by the second return spring 15 at the retraction limit at which the control lever 12 is in abutment against the lever stopper 14 on the pedal bracket 7. Therefore, the engagement pin 16 of the brake pedal 8 is only moved in a direction away from the control lever 12 in response to the forward swing of the pedal 8, and receives no interference from the control lever 12.

Figure 6:
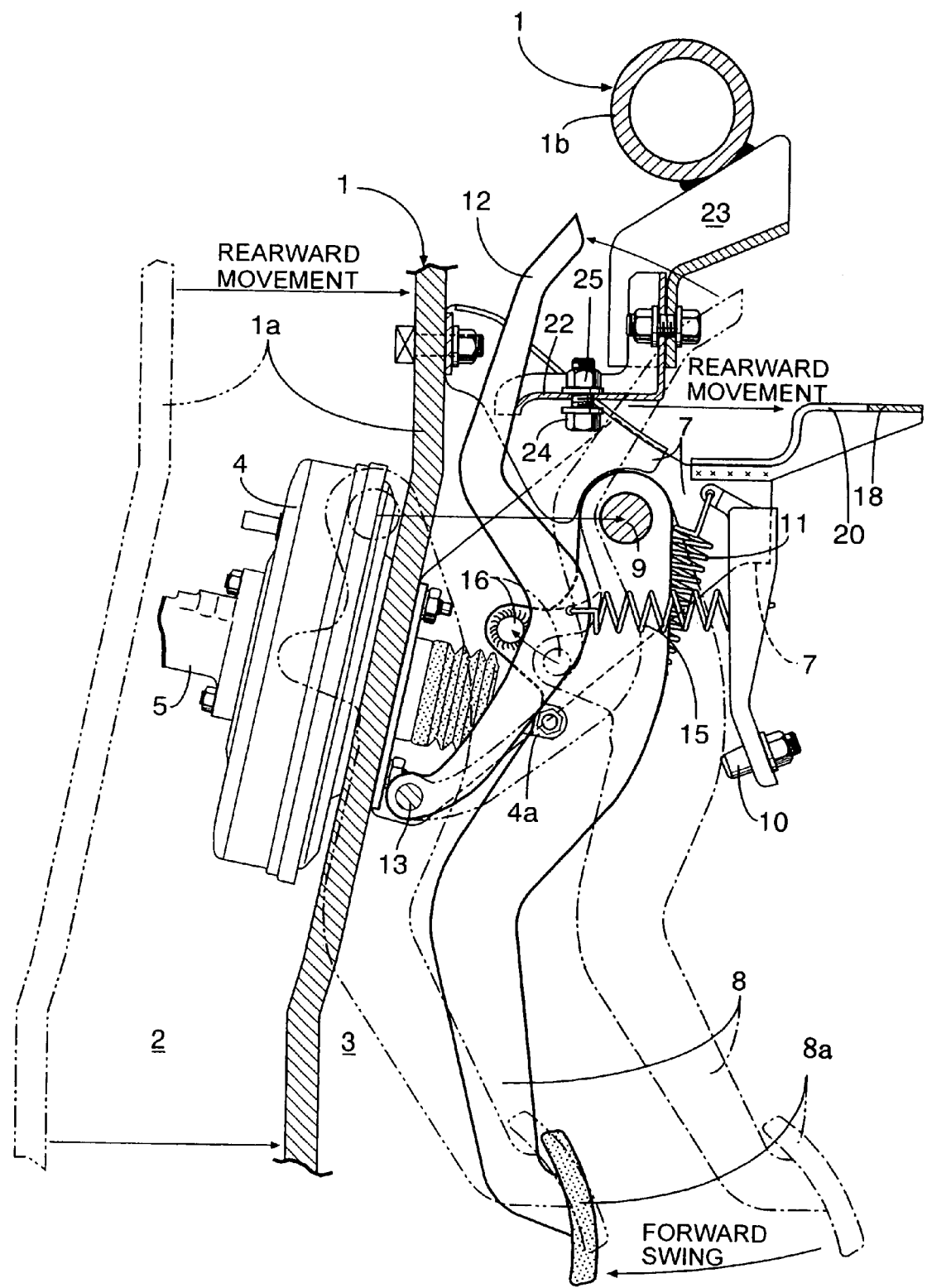
FIG. 6 is a view for explaining the operation of the operating pedal device upon collision of the automobile.

When the dashboard 1a starts to move toward the vehicle compartment 3 upon reception of an excessive rearward shock force due to the frontal collision of the automobile during such operation or non-operation of the brake pedal 8, the excessive shock force is transmitted through the pedal bracket 7 to the guide member 18 and the operating member 22; and hence, the slipping occurs between the members 18 and 22 against the fastening force of the bolt 24. At an initial stage of the rearward movement of the dashboard 1a and the pedal bracket 7 due to the excessive shock force, the brake pedal 8 and the control lever 12 are also moved rearward along with the pedal bracket 7. However, when the amount of movement thereof exceeds a predetermined value, the upper end of the control lever 12 abuts against a front end of the operating member 22, as shown in FIG. 6; and hence, the control lever 12 is swung forward, by the operating member 22, around the second pivot 13 against the preset load of the second return spring 15. This forward swing causes the curved intermediate portion of the control lever 12 to scoop forward the engagement pin 16 of the brake pedal 8; thereby, swinging the brake pedal 8 forward around the first pivot 9. As a result, the rearward movement of the depression portion 8a of the brake pedal 8 is suppressed. Also, upon the occurrence of a collision, the brake pedal 8 is depressed as it is without being deformed; and hence, the brake master cylinder 5 is forcibly operated to automatically generate a braking force, which is effective in avoiding the secondary collision due to the movement of the vehicle after the collision.

As described above, when the dashboard 1*a* is moved rearward due to the frontal collision, the brake pedal 8 is swung forward around the first pivot 9 by the forward swing of the control lever 12 by the operating member 22. Therefore, it is not necessary to cause the pedal bracket 7 to plastically deform; and hence, the rigidity of the peal bracket 8 relative to the brake pedal 8 can be sufficiently enhanced.

In addition, the slipping between the guide member 18 and the operating member 22 avoids the transmission of the excessive shock force to the stay 23 supporting the operating member 22 and to the steering hanger beam 1*b*. Therefore, it is not necessary to specially increase the rigidities of the stay 23 and the steering hanger bam 1*b*; and hence, weights of the stay 23 and the steering hanger bam 1*b* can be decreased.

Moreover, the swing of the control lever 12 depends on the relative displacement of the lever 12 and the operating member 22 cased by the rearward movement of the dashboard 1*a*; and hence, the swing characteristic of the control lever 12 can be stabilized.

The depression amount of the brake pedal 8 can be freely set by the selection of sizes of the members.

The present invention is not limited to the above-described embodiment, and various modifications in design may be made without departing from the subject matter or objectives of the present invention. For example, in place of the bolt 24, a shear pin which is sheared by a shear load equal to or larger than a certain value may provide connection between the guide member 18 and the operating member 22. In addition, if the lateral width of the operating member 22 opposed to the upper end of the control lever 12 is set at a larger value, the control lever 12 can be swung forward by the operating member 22 during the rearward movement of the dashboard 1*a* without use of the guide member 18. The present invention is also applicable to the suppression of the retraction of a depression portion of a clutch pedal.

I claim:
1. An operating pedal device for an automobile, comprising:
   an operating pedal having a depression portion at a lower end thereof and forward-rearward swingably supported on a pedal bracket connected to a dashboard, the operating pedal being connected to an input rod of an actuating device mounted to a front surface of the dashboard;
   an operating member which is opposed to a control lever forward swingably supported on the dashboard or the pedal bracket, the operating member being supported by a steering hanger beam in the rear of the control lever to swing the control lever forward in response to rearward movement of the dashboard upon frontal collision of the automobile; and
   a spring mounted between the pedal bracket and the control lever, wherein the operating pedal includes a fixed engagement pin brought into engagement with the control lever upon forward swing of the control lever to force forward swing of the operating pedal, wherein the dashboard and the steering hanger beam are portions of a vehicle body.

* * * * *